(12) United States Patent
Whitley et al.

(10) Patent No.: US 7,409,739 B2
(45) Date of Patent: Aug. 12, 2008

(54) DOCK LEVELER SUPPORT FRAME AND METHOD OF INSTALLATION

(75) Inventors: L. Blake Whitley, Arlington, TX (US);
James C. Alexander, London (CA);
Richard Hoofard, Dallas, TX (US);
David Saliger, Glenn Heights, TX (US);
Keith F. Moore, Forth Worth, TX (US)

(73) Assignee: 4Front Engineered Solutions, Inc., Sussex, WI (US)

( * ) Notice: Subject to any disclaimer, the term of this patent is extended or adjusted under 35 U.S.C. 154(b) by 177 days.

(21) Appl. No.: 11/347,206

(22) Filed: Feb. 6, 2006

(65) Prior Publication Data

US 2007/0180633 A1    Aug. 9, 2007

(51) Int. Cl.
*E01D 1/00* (2006.01)

(52) U.S. Cl. .......................... 14/71.3; 14/71.1

(58) Field of Classification Search .............. 14/71.1, 14/71.3
See application file for complete search history.

(56) References Cited

U.S. PATENT DOCUMENTS

| 2,639,450 | A | * | 5/1953 | Ramer | 14/71.7 |
| 3,373,879 | A | * | 3/1968 | Verini | 248/647 |
| 4,004,311 | A | * | 1/1977 | Nola | 14/71.7 |
| 4,995,130 | A | * | 2/1991 | Hahn et al. | 14/71.3 |
| 5,111,546 | A | * | 5/1992 | Hahn et al. | 14/71.3 |
| 5,460,460 | A | * | 10/1995 | Alexander | 14/71.3 |

* cited by examiner

*Primary Examiner*—Gary S Hartmann
(74) *Attorney, Agent, or Firm*—Baker & Hostetler LLP

(57) ABSTRACT

A dock leveler support frame includes an upper frame member and a substantially vertical frame member connected thereto. The substantially vertical frame member includes both a structural member and a height-adjusting leg assembly. The leg assembly is adjustable via a drive member proximate the upper frame member. Rotating the drive member raises or lowers the upper frame member by altering the distance between the upper frame member and a foot at the lower end of the leg assembly. Ramp attachment points are also provided proximate the upper frame member. The support frame is installed by placing it in a pit with the upper frame member adjacent the curb, and adjusting the leg assembly to level the upper frame member to the curb. Once level, the back frame is secured to the dock, and the drive member may be secured to the upper frame member to prevent counter-rotation.

21 Claims, 4 Drawing Sheets

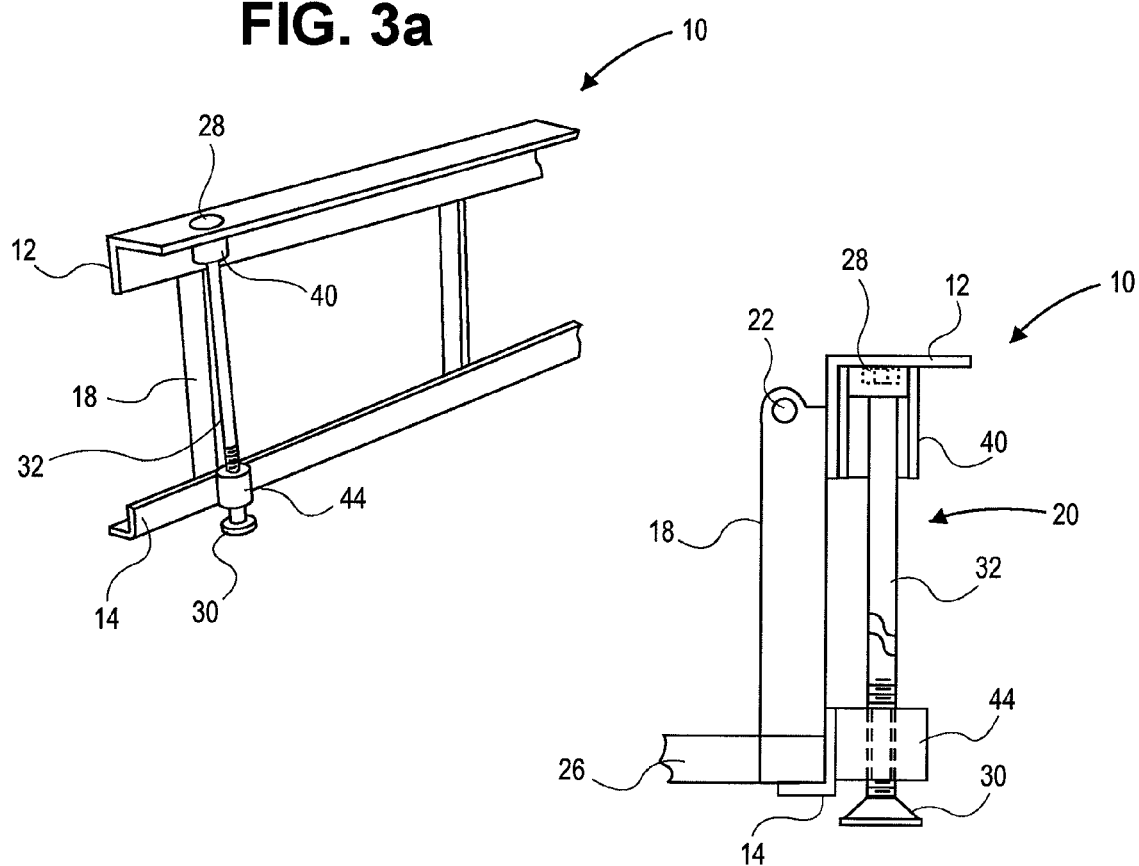
FIG. 3a
FIG. 3b
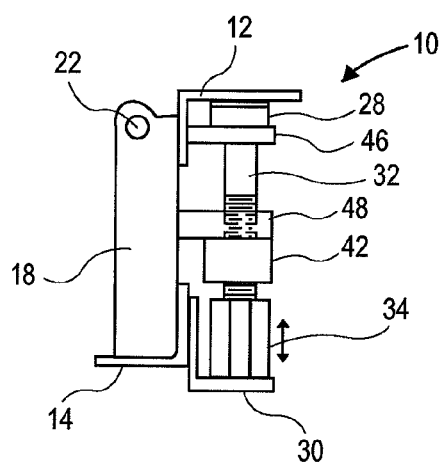
FIG. 4

DOCK LEVELER SUPPORT FRAME AND METHOD OF INSTALLATION

FIELD OF THE INVENTION

The present invention relates generally to dock levelers. More particularly, the present invention relates to a height-adjustable support frame for a dock leveler.

BACKGROUND OF THE INVENTION

Dock levelers, also referred to as dock boards, are mounted in loading docks and are used to bridge the gap between the loading dock floor and the end of a vehicle parked at the loading dock. For example, trucks or tractor trailers may back into a loading dock for loading and unloading, and the dock leveler will form a bridge between the dock floor and the bed of the vehicle being serviced. The dock leveler enables material handling equipment, such as a forklift truck, and material handling personnel to move freely between the dock and the parked vehicle.

Typical dock levelers include a frame or support structure mounted in a recess in the dock known as a pit. A ramp, sometimes referred to as a deck, is generally pivoted about an upper end of the support structure between a horizontal, storage position and a working position where the deck may be rotated upwardly or downwardly to follow the height of a transport vehicle. Often, an extension lip movable between a downwardly hanging pendant position and an extended position is hinged to the forward end of the ramp to serve as an extension thereof.

The dock leveler pit is typically formed from concrete with structural steel angles or channels embedded in the exposed edges thereof, such as along the dock curb. The embedded angle at the rear of the pit (that is, the angle embedded along the rearmost dock floor curb, called the rear curb angle) is generally welded to the dock leveler frame to aid in anchoring the dock leveler in the pit. In this way, the frame can provide a path for vertical and horizontal loads borne by the deck and lip by passing the structural loads through the frame and into the floor and rear curb angle of the pit.

Pit floors, however, will generally not be level and square. For example, the floor of the pit may slope or undulate from front to back, from side to side, or both. To address this problem, extant dock leveler support structures are customarily designed to be shallower than the nominal pit depth, and typically use a stack of thin metal pieces known as shims inserted beneath the frame in order to stabilize the support structure in the pit, similar to how a matchbook or coaster may be used to stabilize a wobbly dining table. Shims are also used to raise the support structure until it is level with the rear curb angle of the dock leveler pit. Shims are typically sized to provide a structural path between the dock leveler and the pit floor, and are generally welded in place, both to each other and to the support frame.

Installing shims is difficult and time consuming, as it requires the installer to crawl under the dock leveler and apply laminations of shims to shore the support structure up to the pit floor. Failure to provide adequate shimming may leave the dock leveler hanging unsupported from the weld between the frame and the rear curb angle. This, in turn, can lead to structural failure of the frame or separation of the dock leveler from the rear curb angle when loaded. Even where adequate shimming is provided to level and stabilize the dock leveler, if the shims are improperly welded, or not welded at all, vibrations suffered during use may induce the shims to "walk" out from under the frame, causing a similarly undesirable condition.

Accordingly, it is desirable to provide a dock leveler support frame that stabilizes and levels the dock leveler, and provides structural support for and a load path between the deck and the pit, without the need to install shimming or access the underside of the support frame during installation.

SUMMARY OF THE INVENTION

The foregoing needs are met, to a great extent, by the present invention, wherein in one aspect an apparatus is provided that in some embodiments provides a dock leveler support frame capable of stabilizing a dock leveler in a pit and leveling the upper portion of the dock leveler with a dock floor, while eliminating the need to shim the support frame or access the underside of the dock leveler during installation.

In accordance with one embodiment of the present invention, a dock leveler support frame is provided. The support frame includes an upper frame member and a substantially vertical frame member connected to the upper frame member. The substantially vertical frame member includes a structural member and a height-adjusting leg assembly. The support frame may also include a lower frame member, to which either or both of the structural member and the leg assembly may be attached. The leg assembly includes a drive member at an upper end thereof, a foot at a lower end thereof, and a drive shaft extending between the drive member and the foot. The support frame may also include attachment points for pivotably receiving a dock leveler ramp. A base frame may extend substantially perpendicularly from the lower frame member.

The drive member is fixedly attached to the drive shaft, and may be integrally formed therewith, so as to transfer rotation of the drive member to the drive shaft. The drive member has a non-circular drive feature that may be engaged by a tool in order to rotate the drive member and drive shaft. The foot may be extendably coupled to the drive shaft via an adjustment nut fixedly attached to the drive shaft and a bolt fixedly attached to the foot, where the adjustment nut and the bolt have mating internal and external threads, respectively. Alternatively, the adjustment nut may be fixedly attached to the foot and extendably attached to the drive shaft. Rotating the drive member results in relative rotation between the threadably-engaged components of the leg assembly (i.e., the adjustment nut and foot or the adjustment nut and drive shaft), thus raising or lowering the upper frame member by extending the foot from the drive shaft or retracting the foot towards the drive shaft.

In another embodiment of the present invention, the distance between the foot and the drive member is constant. An adjustment nut is fixedly attached to the lower frame member and threadably engaged with the drive shaft. Rotation of the drive member will thus raise or lower the upper frame member by moving the upper frame member, lower frame member, and the structural member upwards or downwards along the length of the drive shaft.

In still another embodiment of the invention, a dock leveler support frame is provided that includes an upper frame member and a height-adjusting leg assembly depending from the upper frame member. The height-adjusting leg assembly includes a drive member, a tension rod, a bell crank, and a foot. One end of the tension rod is coupled to the drive member, while the other end is coupled to one end of the bell crank, for example by a clevis. The opposite end of the bell crank is attached to the foot. Rotating the drive member causes the bell crank to pivot, thereby increasing or decreasing the distance between the foot and the upper frame member, and thus raising or lowering the upper frame member.

In yet a further aspect of the present invention, a method of installing a dock leveler is provided. The method includes providing a dock leveler including a back frame having an upper frame member and a substantially vertical, height-adjusting leg assembly depending from the upper frame member. The height-adjusting leg assembly is adjustable via a drive member proximate the upper frame member. The dock leveler is placed in the pit with the back frame adjacent the rear curb angle of the dock, and each leg assembly is adjusted until the upper surface of the upper frame member is level with the upper surface of the rear curb angle. If the dock floor or back frame is not square, the leg assemblies are adjusted in sequence progressing from the lowest point of the dock leveler support frame to the highest point of the dock leveler support frame. Once level, the back frame is secured, for example by welding the upper frame member to an angle embedded into the dock (i.e., the rear curb angle). Final adjustments are made to the drive members to ensure that the feet are firmly planted on the pit floor. The drive members may then be secured to the upper frame member to prevent counter-rotation and destabilization.

In yet another embodiment of the present invention, a dock leveler system is provided. The dock leveler system includes means for supporting a dock leveler ramp and means for adjusting the height of the supporting means to match a height of the dock floor independent of the depth of the pit. The supporting means and adjusting means are integrated. The system may also include means for bridging between the dock floor and a vehicle parked at the dock.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3a is a perspective view of an alternative embodiment of a dock leveler support frame.

FIG. 3b is a side view of a portion of the dock leveler support frame shown in FIG. 3a.

FIG. 4 is another alternative embodiment of a dock leveler support frame.

DETAILED DESCRIPTION

Figure 1:
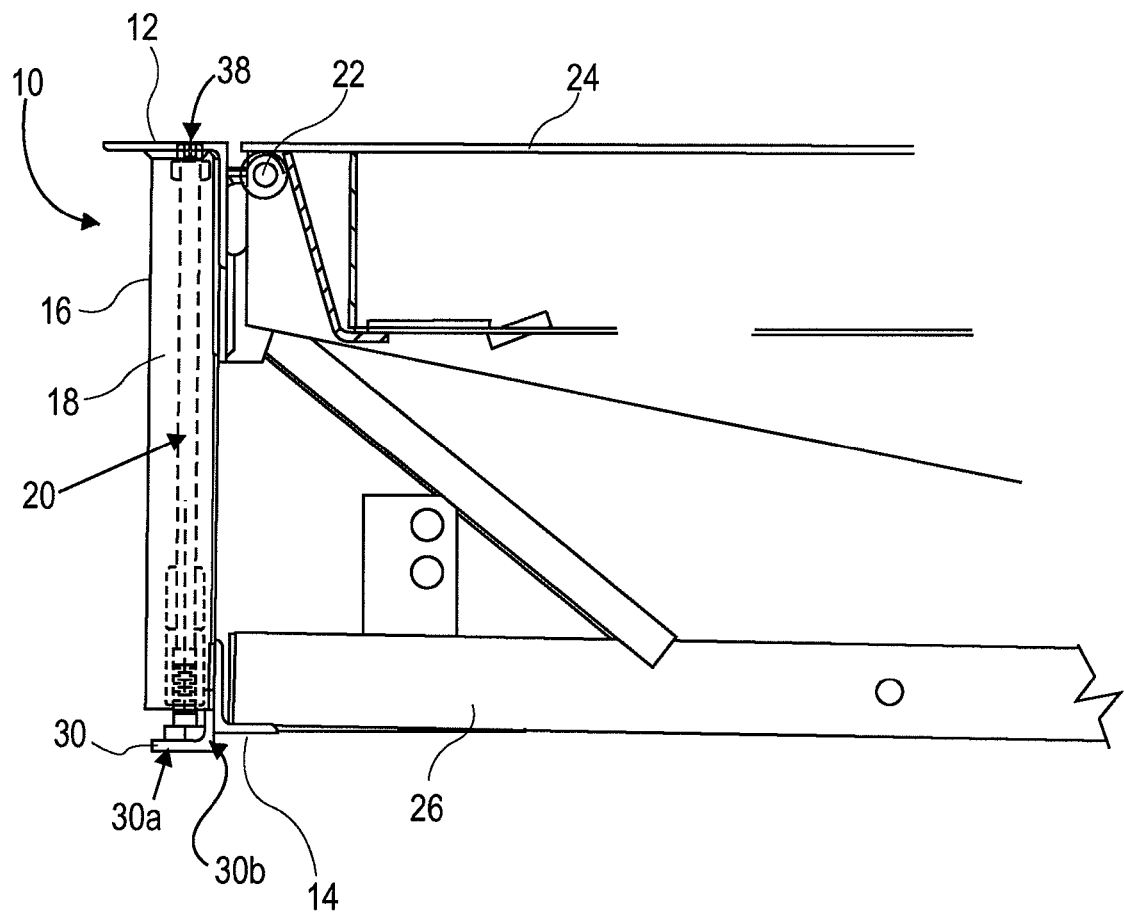
FIG. 1 is a side view illustrating a portion of a dock leveler support frame according to one embodiment of the present invention.

The invention will now be described with reference to the figures, in which like reference numerals refer to like parts throughout. An embodiment in accordance with the present invention provides a dock leveler support frame having an upper frame member and a substantially vertical frame member attached to the upper frame member. The substantially vertical frame member includes both a structural member to provide a path for loads and a height-adjusting leg assembly that permits the frame to be stabilized in the pit and leveled to the dock without shimming. Combining structural members with the adjustable leg assemblies makes the substantially vertical frame members a triangular beam, closed at both top and bottom, thereby improving the strength of the support frame, reducing the moment on the adjustable leg assemblies, and increasing the durability of the support frame by achieving a direct columnar load on the support frame.

The leg assemblies are adjustable via a drive member proximate to and, in embodiments, accessible through the upper frame member, thereby eliminating the need to access the underside of the dock leveler during installation. A drive shaft connects the drive member to a foot at the opposite end of the leg assembly; rotating the drive member raises or lowers the support frame, in embodiments by extending the foot from or retracting the foot towards the drive shaft. Adjustments may be made both to stabilize the support frame in the pit and to raise or lower the upper frame member until it is level with the rear curb angle. Once the dock leveler is so stabilized and leveled, the support frame can be secured to the dock, in particular to an angle embedded in the dock, and a final adjustment made to the drive members to ensure the feet are firmly planted on the floor of the pit. The drive members may then be secured to prevent counter-rotation and destabilization of the support frame.

Referring now to FIG. 1, a side view of a partial dock leveler support frame 10 according to an embodiment of the present invention is shown. Dock leveler support frame 10 generally includes an upper frame member 12, a lower frame member 14, and two or more substantially vertical frame members 16 connecting upper and lower frame members 12, 14. Some embodiments of support frame 10 include at least three substantially vertical frame members 16 spaced along the width of support frame 10. The relative positions of substantially vertical frame members 16 along the width of support frame 10 are consistent with the expected loading of support frame 10. For example, substantially vertical frame members 16 may be positioned along support frame 10 in line with the expected path of travel of a loaded forklift passing between the dock and a vehicle being serviced (that is, in line with the forklift wheels).

Upper frame member 12, lower frame member 14, and substantially vertical frame members 16 may be collectively referred to as a back frame. As will be described in further detail below, each substantially vertical frame member 16 includes both a structural member 18 and a height-adjustable leg assembly 20. Leg assembly 20 is shown partially in phantom in FIG. 1 and in further detail in FIG. 2. In certain embodiments of the invention, upper frame member 12, lower frame member 14, and structural members 18 are angle members. Structural members 18 are affixed to upper frame member 12 and lower frame member 14.

At least two, and in some embodiments three or more, ramp hinge supports 22 are provided along upper frame member 12 to pivotably receive a dock leveler ramp 24. Ramp hinge supports 22 may be co-located proximate substantially vertical frame members 16 along upper frame member 12 to facilitate the transfer of ramp loads along structural members 18 and legs 20 and into the floor of the pit. It should be understood, however, that other configurations of ramp hinge supports 22 are contemplated. In some embodiments in accordance with the present invention, a base frame 26 is attached to the back frame, for example at lower frame member 14, extending substantially perpendicularly from lower frame member 14.

Figure 2:
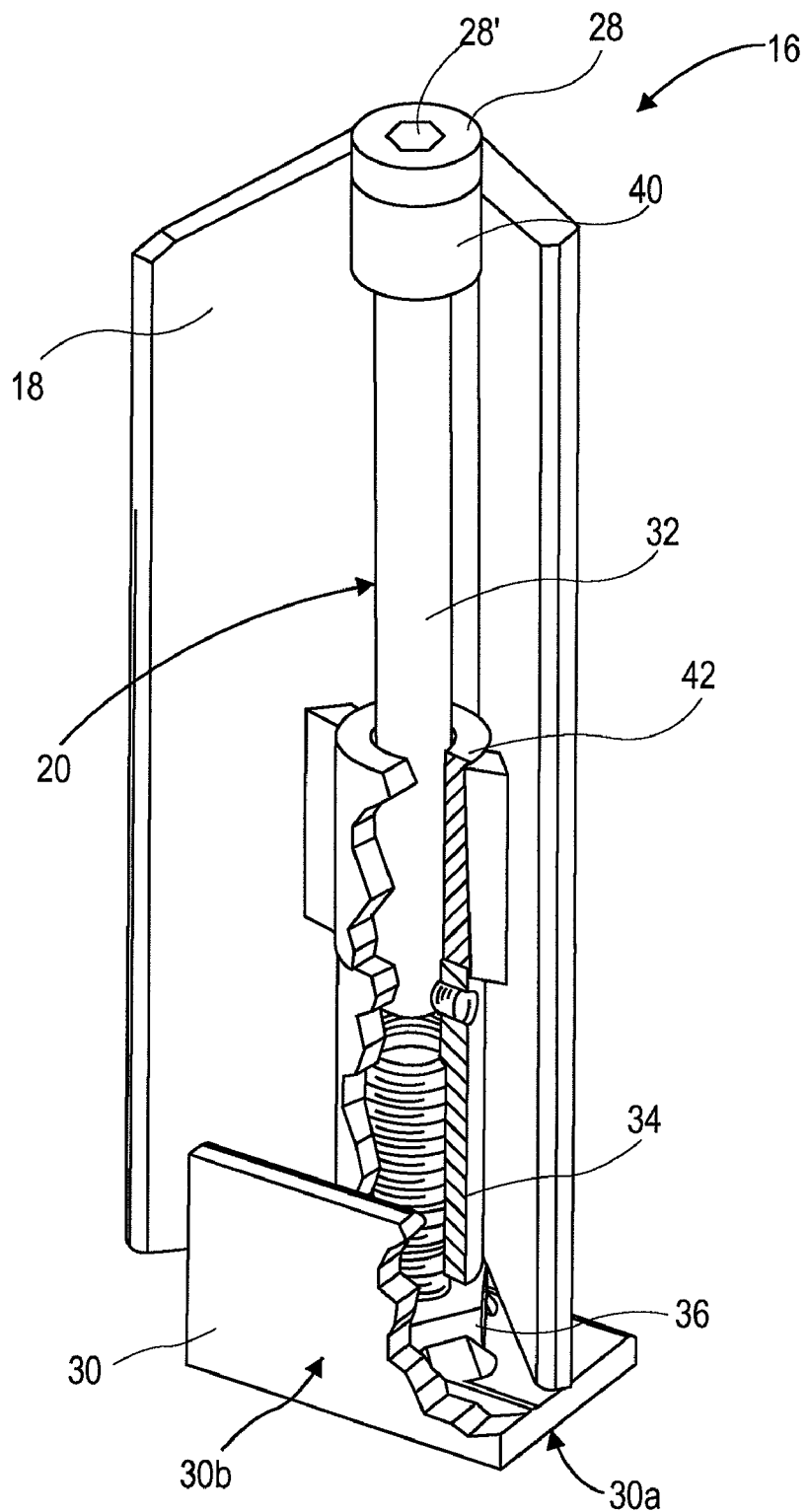
FIG. 2 is a partial cutaway view of a substantially vertical frame member, including a leg and a structural member, according to one embodiment of the present invention.

FIG. 2 is a partial cutaway view of substantially vertical frame member 16, including structural member 18 and leg assembly 20, according to one embodiment of the present invention. Leg assembly 20 generally includes a drive member 28, a foot 30, and a drive shaft 32 extending between drive member 28 and foot 30.

Drive member 28 is fixedly attached to the upper end of drive shaft 32, for example by welding or via a set screw. Alternatively, drive member 28 may be integrally formed with drive shaft 32 at the upper end thereof. Thus, there can be no relative rotation between drive member 28 and drive shaft 32. Drive member 28 includes a drive feature 28' engageable by a tool. Drive feature 28' is non-circular, such that rotating the tool will rotate drive member 28 and, in turn, drive shaft 32. In some embodiments of the invention, drive member 28 is a hex fastener rotatable via a hex wrench. However, other types of drive members 28 having drive features 28' designed to engage a tool capable of imparting rotation are regarded as within the spirit and scope of the present invention.

Foot 30 is extendably coupled to the lower end of drive shaft 32. In embodiments, foot 30 is an angle section having a flat surface 30a at the contact interface with the pit floor. One side 30b of the angle section abuts lower frame member 14 in order to prevent free rotation of foot 30 when adjusting the height of leg assembly 20. This ensures that foot 28 remains properly aligned and facilitates height adjustment as described below (that is, by facilitating relative rotation between drive shaft 32 and foot 30).

In embodiments, the lower end of drive shaft 32 is fixedly attached to an adjustment nut 34 via a set screw, a weld, or any other method now known or later developed, such that relative rotation between adjustment nut 34 and drive shaft 32 is precluded. Alternatively, adjustment nut 34 and drive shaft 32 may be integrally formed. Adjustment nut 34 is, in turn, extendably coupled to foot 30, for example by mating internal threads on adjustment nut 34 with external threads on a bolt 36 fixedly attached to foot 30. It should be apparent from this disclosure that rotating drive member 28 will result in corresponding rotation of drive shaft 32 due to the fixed attachment between drive member 28 and drive shaft 32. This, in turn, rotates fixedly attached adjustment nut 34, and causes foot 30 to extend or retract from adjustment nut 34, foot 30 being prevented from rotating by the abutment between surface 30b and lower frame member 14.

Drive member 28 of leg assembly 20 is accessible via a corresponding access hole 38 in upper frame member 12, shown in FIG. 1. Other configurations of access hole 38, such as in ramp 24 or as a gap created when ramp 24 is in a below-dock position, are regarded as within the scope and spirit of the present invention. Rotating drive member 28 in a first direction transfers the rotational motion along drive shaft 32, thereby causing adjustment nut 34 to turn relative to bolt 36. This, in turn, causes foot 30 to extend away from nut 34, thereby increasing the height of leg assembly 20 and raising the corresponding segment of upper frame member 12. Rotating drive member 28 in a second, opposite direction transfers opposite rotational motion along drive shaft 32, thereby causing adjustment nut 34 to turn relative to bolt 36 and foot 30 to retract towards adjustment nut 34. This decreases the height of leg assembly 20 and lowers the corresponding segment of upper frame member 12.

To connect leg assembly 20 with structural member 18, drive shaft 32 extends through a guide bushing 40 proximate upper frame member 12 and a load bushing 42 proximate lower frame member 14. Connection between structural members 18 and leg assembly 20 is provided by fixedly attaching both guide bushing 40 and load bushing 42 to structural member 18, such as by welding, though other methods of attaching guide bushing 40 and load bushing 42 to structural member 18 are regarded as within the spirit and scope of the present invention.

FIGS. 3a and 3b illustrate an alternative embodiment of a dock leveler support frame 10. As in the embodiment described above, structural member 18 is secured to both upper frame member 12 and lower frame member 14. Guide bushing 40, shown in partial cutaway in FIG. 3b for clarity, is secured to upper frame member 12, and a nut 44 is secured to lower frame member 14. Thus, leg assembly 20 is connected to structural member 18 through upper frame member 12 and lower frame member 14, rather than by securing leg assembly directly to structural member 18.

As illustrated in FIG. 3b, foot 30 is attached to drive shaft 32, optionally via a swiveling ball joint. That is, in contrast to the embodiment shown in FIG. 2, foot 30 is not extendable and retractable with respect to leg assembly 20. Rather, the distance between drive member 28 and foot 30 is fixed. Drive shaft 32 is threaded through nut 44 such that there can be relative rotation between drive shaft 32 and nut 44. Rotating drive member 28 in a first direction will cause upper frame member 12, lower frame member 14, and structural member 18 to collectively move upwards along drive shaft 32, thereby increasing the height of support frame 10. Similarly, rotating drive member 28 in a second, opposite direction will cause upper frame member 12, lower frame member 14, and structural member 18 to collectively move downwards along drive shaft 32, thereby lowering support frame 10. Once support frame 10 is properly leveled, drive member 28 can be secured to upper frame member 12 to prevent counter-rotation of drive member 28.

Another embodiment of a dock leveler support frame 10 is shown in FIG. 4. Leg assembly 20 is secured to dock leveler support frame 10 via an upper support collar 46 secured to upper frame member 12 and a bushing 48 affixed to structural member 18. Load bushing 42 is affixed to drive shaft 32. In contrast to the embodiment illustrated in FIG. 2, foot 30 is fixedly attached to adjustment nut 34, which is, in turn, extendably coupled to the lower end of drive shaft 32. The lower end of drive shaft 32 is threaded to mate with adjustment nut 34. These threads may be integrally formed with drive shaft 32. It should be clear to one skilled in the art from this disclosure that, analogous to the embodiment described above with respect to FIG. 2, rotation of drive member 28 causes relative rotation between drive shaft 32 and foot 30, which results in the extension or retraction of adjustment nut 34 and foot 30 from or towards drive shaft 32 and the corresponding raising or lowering of upper frame member 12.

Figure 5:
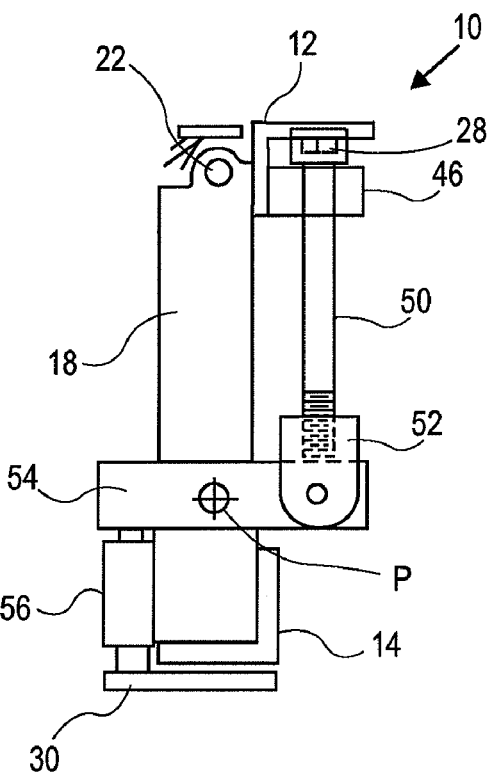
FIG. 5 illustrates another embodiment of a dock leveler support frame.

FIG. 5 illustrates another embodiment of a dock leveler support frame 10. Upper support collar 46 secures a tension rod 50, which replaces drive shaft 32, to upper frame member 12. A clevis 52 attaches tension rod 50 to a bell crank 54 at one end thereof. Foot 30 is coupled to the opposite end thereof, and is secured to structural member 18 via a guide bushing 56. Rotating drive member 28 will pivot bell crank 54 about pivot P, thereby raising or lowering foot 30. Other methods of actuating bell crank 54, including actuation from the front thereof, are regarded as within the spirit and scope of the present invention. It should also be noted that bell crank 54 may be replaced by a scissor-like device without departing from the spirit or scope of the present invention.

Figure 6:
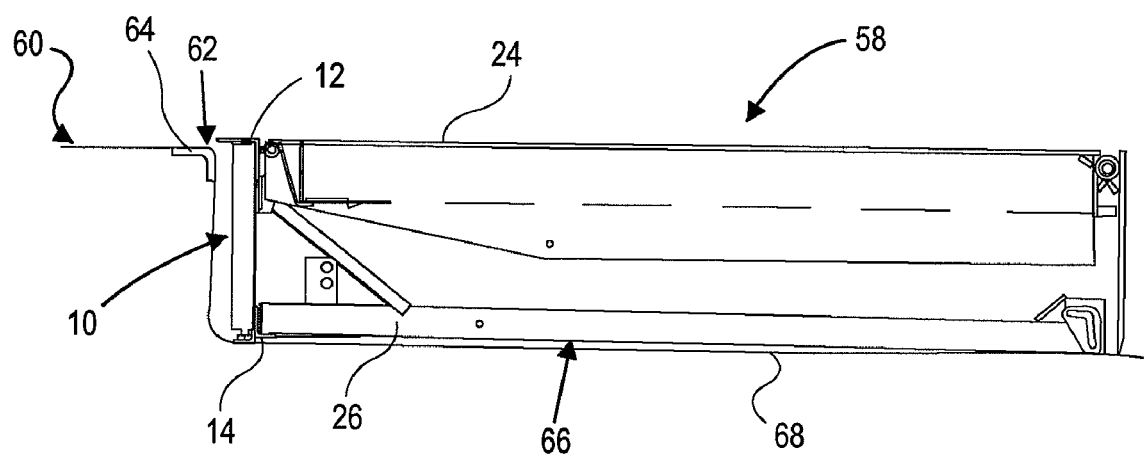
FIG. 6 is side view of an installed dock leveler incorporating a support frame according to the present invention.

Installation of a dock leveler 58 incorporating a support frame 10 according to the present invention will be described with reference to FIG. 6. A dock floor 60 has a curb 62 with a rear curb angle 64 embedded therein. Dock leveler 58 is located in a pit 66 having a floor 68 that may not be level. Dock leveler 58 is placed in pit 66 with the back frame, particularly upper frame member 12, abutting rear curb angle 64. The upper surface of upper frame member 12 may not initially be flush with the upper surface of rear curb angle 64. The installer then engages an appropriate tool with drive features 28' on each drive member 28 proximate upper frame member 12, and rotates drive member 28 in the appropriate direction to raise or lower upper frame member 12 until the upper surface thereof is level with the upper surface of rear curb angle 64 adjacent currently-adjusted leg assembly 20. The installer repeats this process for each leg assembly 20 on support frame 10. If support frame 10 or floor 68 of pit 66 is not square, leg assemblies 20 should be adjusted in a sequence progressing from leg assembly 20 adjacent the lowest point of upper frame member 12 to leg assembly 20 adjacent the highest point of upper frame member 12.

Once the upper surface of upper frame member 12 is level with the upper surface of rear curb angle 64, upper frame member 12 is secured to rear curb angle 64, for example by welding upper frame member 12 and rear curb angle 64 together. Each drive member 28 is then finally torqued to ensure that feet 30 are firmly placed on floor 68 of pit 66. Once the installer has verified that each foot 30 is firmly in place, each drive member 28 is secured to prevent counter-rotation and instability of support frame 10. This may be accomplished, for example, by tack welding drive members 28 to upper frame member 12.

Although an example of the support frame 10 is shown using a hex fastener as drive member 28, it will be appreciated that other fasteners can be used consistent with the teachings of the present invention. Further, though drive member 28 is preferably fixedly attached to drive shaft 32, removable attachment between drive member 28 and drive shaft 32 is regarded as within the scope of the present invention, provided the attachment between drive member 28 and drive shaft 32 is capable of transferring rotational motion. Also, although support frame 10 is useful for supporting a dock leveler, it can also be used in any application where it is desirable to level a support structure to a floor without shimming.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A dock leveler support frame, comprising:
    an upper frame member configured to be a part of a dock leveler support frame; and
    a substantially vertical frame member connected to said upper frame member, wherein said substantially vertical frame member includes a structural member and a height-adjusting leg assembly, wherein said height-adjusting leg assembly further comprises:
    a drive member at an upper end of said leg assembly;
    a foot at a lower end of said leg assembly; and
    a drive shaft extending between said drive member and said foot, said drive member being attached to an upper end of said drive shaft, and said foot being attached to a lower end of said drive shaft.

2. The support frame of claim 1, wherein said drive member is accessed via a corresponding access hole proximate said upper frame member.

3. The support frame of claim 2, wherein said access hole is in said upper frame member.

4. The support frame of claim 1, wherein said foot is extendably coupled to said lower end of said drive shaft.

5. The support frame of claim 4, wherein said foot and said drive shaft are threadably engaged, and wherein said foot is positioned so as to facilitate relative rotation between said foot and said drive shaft.

6. The support frame of claim 4, wherein rotating said drive member in a first direction causes said foot to extend from said drive shaft and rotating said drive member in a second direction causes said foot to retract towards said drive shaft.

7. The support frame of claim 1, wherein rotating said drive member in a first direction raises said upper frame member away from said foot and rotating said drive member in a second direction lowers said upper frame member towards said foot.

8. The support frame of claim 1, wherein said height-adjusting leg assembly is connected to said structural member.

9. The support frame of claim 1, further comprising at least two ramp hinge supports disposed proximate said upper frame member.

10. The support frame of claim 1, wherein two or more substantially vertical frame members connect said upper frame member and a lower frame member at positions thereon according to an expected loading of said support frame.

11. The support frame of claim 1, further comprising a base frame extending substantially perpendicularly from a lower frame member.

12. A dock leveler support frame, comprising:
    an upper frame member configured to be a part of a dock leveler support frame; and
    a substantially vertical frame member connected to said upper frame member, wherein said substantially vertical frame member includes a structural member and a height-adjusting leg assembly, wherein said height-adjusting leg assembly further comprises:
    a drive member at a first end of said leg assembly;
    a foot at a second end of said leg assembly; and
    a bell crank,
    wherein said drive member is operatively connected to a first end of said bell crank and wherein said foot is attached to a second end of said bell crank, such that actuation of said drive member actuates said bell crank to thereby alter a distance between said upper frame member and said foot.

13. The support frame of claim 12, further comprising at least two ramp hinge supports disposed proximate said upper frame member.

14. The support frame of claim 12, wherein two or more substantially vertical frame members connect said upper frame member and a lower frame member at positions thereon according to an expected loading of said support frame.

15. The support frame of claim 12, further comprising a base frame extending substantially perpendicularly from a lower frame member.

16. A method of installing a dock leveler in a pit adjacent a dock having a curb at one end thereof, comprising:
   providing a dock leveler comprising a back frame having an upper frame member and a substantially vertical, height-adjusting leg assembly depending therefrom, the height-adjusting leg assembly being adjustable by rotating a drive member proximate the upper frame member;
   placing the dock leveler in the pit with the back frame adjacent the curb;
   adjusting the leg assembly until the upper frame member is level with the dock; and
   securing the back frame to the dock.

17. The method of claim 16, wherein said adjusting step comprises sequentially adjusting two or more height-adjusting leg assemblies starting with a first height-adjusting leg assembly adjacent a lowest point of the dock and progressing to a final height-adjusting leg assembly adjacent a highest point of the dock.

18. The method of claim 16, wherein said securing step comprises welding the upper frame member to an angle embedded in the dock.

19. The method of claim 16, further comprising securing the drive member to prevent counter-rotation thereof.

20. The method of claim 19, wherein said step of securing the drive member comprises welding the drive member to the upper frame member.

21. The method of claim 16, further comprising making a final adjustment to the drive member after securing the back frame to the dock.

* * * * *